(12) United States Patent
Bakker et al.

(10) Patent No.: US 7,854,133 B2
(45) Date of Patent: Dec. 21, 2010

(54) AIR CONDITIONING SERVICE STATION WITH ELECTRICALLY DRIVEN ANALOG-DISPLAY PRESSURE GAUGES

(75) Inventors: Travis Bakker, Mantorville, MN (US); William Brown, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 1181 days.

(21) Appl. No.: 11/477,592

(22) Filed: Jun. 30, 2006

(65) Prior Publication Data
US 2008/0000254 A1  Jan. 3, 2008

(51) Int. Cl.
*F25B 45/00* (2006.01)
(52) U.S. Cl. .......................................... 62/149; 62/292
(58) Field of Classification Search ............ 62/87, 62/149, 292, 401, 475
See application file for complete search history.

(56) References Cited

U.S. PATENT DOCUMENTS

| | | | |
|---|---|---|---|
| 4,967,567 A * | 11/1990 | Proctor et al. | 62/127 |
| 4,982,576 A * | 1/1991 | Proctor et al. | 62/292 |
| 5,317,903 A * | 6/1994 | McClelland et al. | 62/77 |
| 6,334,320 B1 * | 1/2002 | Brown et al. | 62/149 |
| 2006/0130510 A1 * | 6/2006 | Murray et al. | 62/292 |

* cited by examiner

*Primary Examiner*—Melvin Jones
(74) *Attorney, Agent, or Firm*—Baker & Hostetler LLP

(57) ABSTRACT

An apparatus and method for displaying pressure on electrically driven analog-display pressure gauges. A diagnostic service equipment for a vehicle having a refrigerant system, the refrigerant system having a plumbing circuit for transferring a refrigerant between the diagnostic service equipment and the refrigerant system of the vehicle; a high side refrigerant conduit having a first connection, a second connection and a third connection, wherein the first connection is connected to the plumbing circuit and the second connection is connected to the refrigerant system; a low side refrigerant conduit having a first connection, a second connection and a third connection, wherein the first connection is connected to the plumbing circuit and the second connection is connected to the refrigerant system; and pressure transducers attached to each of the third connection of the high side refrigerant conduit and the low side refrigerant conduit, wherein the pressure transducers measure pressure of the high side and low side refrigerant conduits and convert the pressure into electrical signals to drive an analog-display pressure gauge.

22 Claims, 3 Drawing Sheets

AIR CONDITIONING SERVICE STATION WITH ELECTRICALLY DRIVEN ANALOG-DISPLAY PRESSURE GAUGES

FIELD OF THE INVENTION

The present invention relates generally to air conditioning service station. More particularly, the present invention relates to air conditioning service station with electrically driven analog-display pressure gauges.

BACKGROUND OF THE INVENTION

During servicing of refrigerant circuits, such as the air conditioning system of a vehicle, the refrigerant is recovered, recycled and recharged. As the refrigerant capacity of mobile air conditioning system becomes increasingly small due to environmental regulations, it is increasingly more difficult to measure the accuracy of the refrigerant charge because any residual refrigerant in a tube or hose will change the accuracy of the measurement.

Typically, when charging the air conditioning system with refrigerant, the pressures of the air conditioning system are displayed to the user on direct pressure measuring analog gauges on the control panel of the machine. It is necessary to have tubes to transmit the pressure from the air conditioning system, at the end of the hoses, to the direct pressure measuring gauges on the control panel. Typical service hoses are 8 feet long, therefore, the tubes that are used to transmit pressure to the gauges would have to be at least the same length. Hence, the volume of the refrigerant in the long pressure tube would be significant enough to decrease the accuracy of the refrigerant charge.

Accordingly it is desirable to provide a diagnostic service equipment capable of accurately measuring the charge accuracy of an air-conditioning station using electrically driven analog-display pressure gauges.

SUMMARY OF THE INVENTION

The foregoing needs are met, to a great extent, by the present invention, wherein in one embodiment an apparatus is provided that an air conditioning service and diagnosing equipment and tools with electrically driven pressure gauges with analog displays of pressure to accurately measure the charge of an air conditioning system.

In accordance with one embodiment of the present invention, a diagnostic service equipment for a vehicle having a refrigerant system, having (a) a plumbing circuit for transferring a refrigerant between the diagnostic service equipment and the refrigerant system of the vehicle; (b) a high side refrigerant conduit having a first connection, a second connection and a third connection, wherein the first connection is connected to the plumbing circuit and the second connection is connected to the refrigerant system; (c) a low side refrigerant conduit having a first connection, a second connection and a third connection, wherein the first connection is connected to the plumbing circuit and the second connection is connected to the refrigerant system; and (d) pressure transducers attached to each of the third connection of the high side refrigerant conduit and the low side refrigerant conduit, wherein the pressure transducers measure pressure of the high side and low side refrigerant conduits and convert the pressure into electrical signals to drive an analog-display pressure gauge. The analog-display pressure gauge having an electrically driven needle, such that the electrically driven needle is an indicator needle. The pressure transducers transform the electrical signals into mechanical movement to drive the needle, such that the movement of the needle reflects the pressure of the refrigerant conduit measured by the pressure transducers. The diagnostic equipment further having at least one inlet solenoid valve configured between the first connection of the refrigerant conduit and the plumbing circuit, such that the solenoid valve controls the flow of the refrigerant, and a controller electrically connected to the plumbing circuit and the solenoid valve, wherein the controller controls the solenoid valve through an electrical signal.

In accordance with another embodiment of the present invention, a diagnostic service equipment for a vehicle having a refrigerant system, comprising: (a) a plumbing circuit for transferring a refrigerant between the diagnostic service equipment and the refrigerant system of the vehicle; (b) a high side refrigerant conduit having a first connection, a second connection and a third connection, wherein the first connection is connected to the plumbing circuit and the second connection is connected to the refrigerant system; (c) a low side refrigerant conduit having a first connection, a second connection and a third connection, wherein the first connection is connected to the plumbing circuit and the second connection is connected to the refrigerant system; and (d) pressure transducers attached to each of the third connection of the high side refrigerant conduit and the low side refrigerant conduit, wherein the pressure transducers measure pressure of the high side and low side refrigerant conduit and convert the pressure into electrical signals to display on an electrical display. The electrical display can display the pressure graphically, numerically, or a combination thereof.

In accordance with yet another embodiment of the present invention, a diagnostic service equipment for a vehicle having a refrigerant system, comprising: (a) a plumbing circuit for circulating a refrigerant between the diagnostic equipment and the refrigerant system of the vehicle; (b) a high side refrigerant conduit having a first connection, a second connection and a third connection, wherein the first connection is connected to the plumbing circuit and the second connection is connected to the refrigerant system; (c) a low side refrigerant conduit having a first connection, a second connection and a third connection, wherein the first connection is connected to the plumbing circuit and the second connection is connected to the refrigerant system; (d) pressure transducers configured to attached to each of the third connection of the high side refrigerant conduit and the low side refrigerant conduit, wherein the pressure transducers measure pressure of the high side and low side refrigerant conduit and convert the pressure into electrical signals; and (e) electrical wires connecting the pressure transducers to a controller, wherein the controller is electrically connected to a display. The pressure transducers transform the pressure into the electrical signal to the controller. The display is an electrical display or an electrically driven analog-display pressure gauge. The analog-display pressure gauge having an electrically driven indicator needle and the indicator needle is electrically driven by the controller. The electrical display is configured to display pressures digitally or graphically. The controller is further electrically connected to the plumbing circuit and at least one solenoid valve. The solenoid valve is configured between the first connection of the refrigerant conduit and the plumbing circuit, such that the solenoid valve controls the flow of the refrigerant. The controller electrically controls the solenoid valves through an electrical signal to control the flow of the refrigerant.

In accordance with still another embodiment of the present invention, a diagnostic equipment for a vehicle, comprising: (a) means for circulating a refrigerant between the diagnostic equipment and the vehicle; (b) a high side passage means having a first connection, a second connection and a third connection, wherein the first connection is connected to the circulating means and the second connection is connected to the vehicle; (c) a low side passage means having a first connection, a second connection and a third connection, wherein the first connection is connected to the circulating means and the second connection is connected to the vehicle; (d) an pressure sensing means configured to attached to each of the third connection of the high side passage means and the low side passage means, wherein the pressure sensing means measure pressure of the high side and low side passage means as electrical signals; and (e) a signaling means connecting the energy transforming means to at least one display means. The display means is an analog-display pressure gauge, an electrical display, a graphical display, or a combination thereof. The analog-display pressure gauge having an electrically driven needle. The pressure sensing means transform the electrical signals into mechanical movements to drive the needle, such that the movements of the needle reflects the pressure of the passage means measured by the pressure sensing means.

In accordance with yet another embodiment of the present invention, a method for displaying the pressure on analog-display pressure gauges, having the steps of: (a) connecting vehicle couplers of a high side and a low side refrigerant conduits to a vehicle; (b) circulating refrigerant between the air conditioning service station and the vehicle; (c) measuring the pressure of the refrigerant conduits as electrical signals; (d) transforming the electrical signals to the analog-display pressure gauges; and (e) electrically driving the needles to display the pressure mechanically. The method further having the steps of: providing at least one solenoid valve, wherein the solenoid valve is configured between the first connection of the refrigerant conduit and the plumbing circuit; and controlling the flow of the refrigerant with the solenoid valve; and providing a controller electrically connected to the plumbing circuit and the solenoid valve, wherein the controller controls the solenoid valves through an electrical signal.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention includes an air conditioning service and diagnosing equipment and tools with electrically driven analog gauges to accurately measure the charge of an air conditioning system. Valves are coupled to the ends of refrigerant hoses on the air conditioning service station so that pressure can be measured on the air conditioning system side of the valves with pressure transducers. The pressure transducers can then send an electrical signal to drive the electrically driven analog-display pressure gauges.

Figure 1:
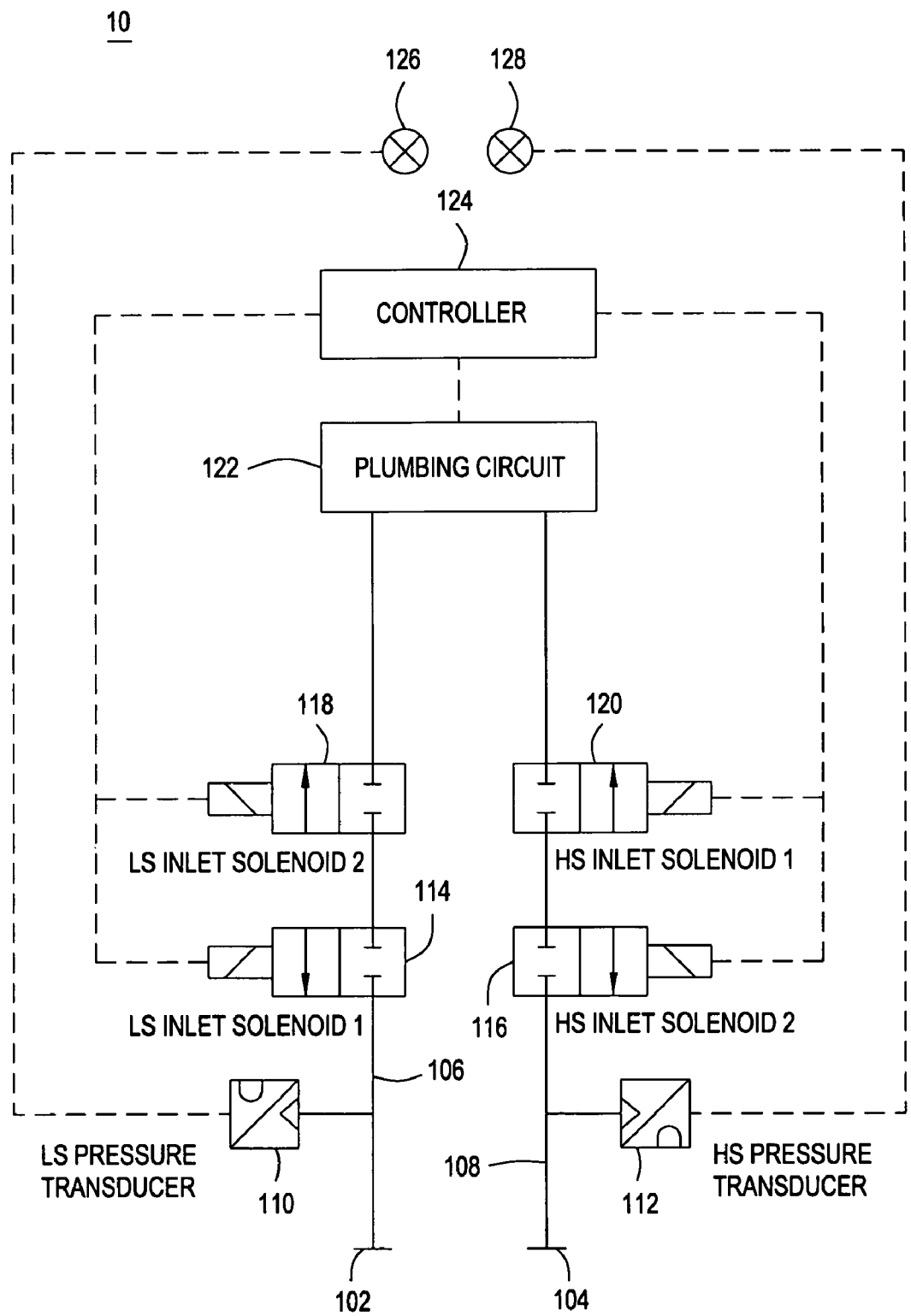
FIG. 1 is a view illustrating an electrically driven analog gauges incorporated in an air conditioning service station according to an embodiment of the invention.
Figure 3:
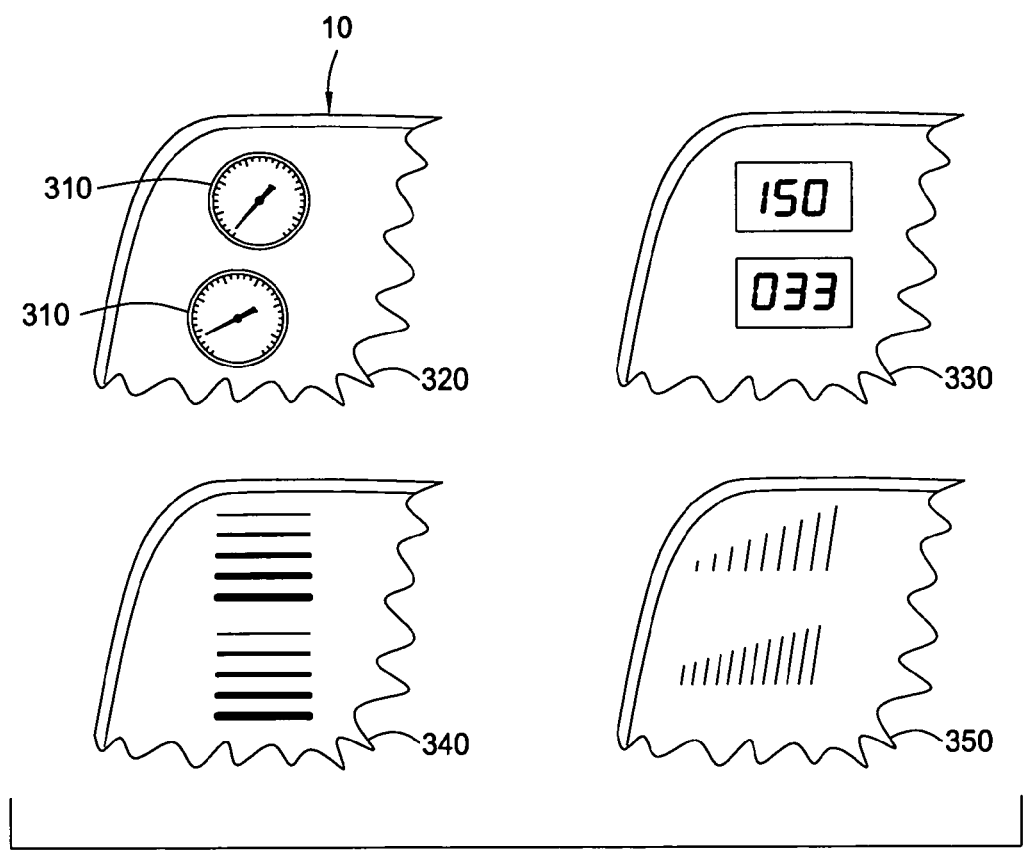
FIG. 3 illustrates examples of gauges according to an embodiment of the invention.

The invention will now be described with reference to the drawing figures, in which like reference numerals refer to like parts throughout. FIG. 1 is a view illustrating electrically driven analog gauges incorporated in an air conditioning service station according to an embodiment of the invention. In this embodiment, the electrically driven analog pressure gauges 126, 128 are driven directly by transducer output 110, 112, respectively. The station 10 having a controller 124 electrically connected to a plumbing circuit 122 and two sets of inlet solenoids, low side inlet solenoid 114, 118 and high side inlet solenoid 116, 120. Furthermore, two electrically driven pressure gauges, low side pressure gauge 126 and high side pressure gauge 128 are electrically connected to the low side pressure transducer 110 and the high side pressure transducer 112, respectively. These pressure gauges 126, 128 having electrically driven needles 310 (FIG. 3).

In addition, a low side refrigerant conduit 106 is connected to the low side pressure transducer 110 and the plumbing circuit 122 through the low side inlet solenoids 114, 118. The low side refrigerant conduit 106 is further coupled to a low side vehicle coupler 102. Similarly, a high side refrigerant conduit 108 is connected to the high side pressure transducer 112 and the plumbing circuit 122 through the high side inlet solenoids 116, 120. The high side refrigerant conduit 108 is further coupled to a high side vehicle coupler 104.

In this embodiment, the pressure transducers 110, 112 drive the gauges directly using electrical signals instead of the refrigerant in the conduits as in the prior art. Therefore, upon measuring the pressure of the air conditioning system of a vehicle, the pressure transducers 110, 112 convert the electrical signal into mechanical movement and drive the needles 310 of the analog gauges 126, 128.

By measuring pressure of the air conditioning system with transducers and transmitting the pressure electrically to the pressure gauges, this eliminates the volume of refrigerant that would normally occupy a tube used to transmit pressure between the valves at the end of the service hoses and the direct pressure measuring gauges. Therefore, the current embodiment increases refrigerant charge accuracy. Furthermore, displaying the pressure on analog pressure displays driven with an electrical signal allows the user to monitor the pressures on familiar analog displays. Electrically driven analog pressure displays also allow the gauges to display pressures that were recorded at an earlier time. In addition, electrically driven analog-display pressure gauges also allow discrete pressure gauges with an electrically powered mechanical movement on an analog display or an analog graphic on a digital display.

The plumbing circuit 122 transfers refrigerant between the air conditioning service station 10 and a vehicle. The solenoid valves 114, 116, 118, 120 are configured between the plumbing circuit 122 and the ends of the refrigerant conduits, such that the solenoid valves 114, 116, 118, 120 control the flow of the refrigerant. In addition, the controller 124 is electrically connected to the plumbing circuit 122 and the solenoid valves 114, 116, 118, 120, such that the controller controls the solenoid valves through electrical signals.

In another embodiment, the pressure transducers 110, 112 are electrically connected an electrical display (not shown). The electrical display can display pressure graphically, numerically, or a combination thereof. For example, an electrical display can display the pressure as an analog graphic with a dial and a needle.

Figure 2:
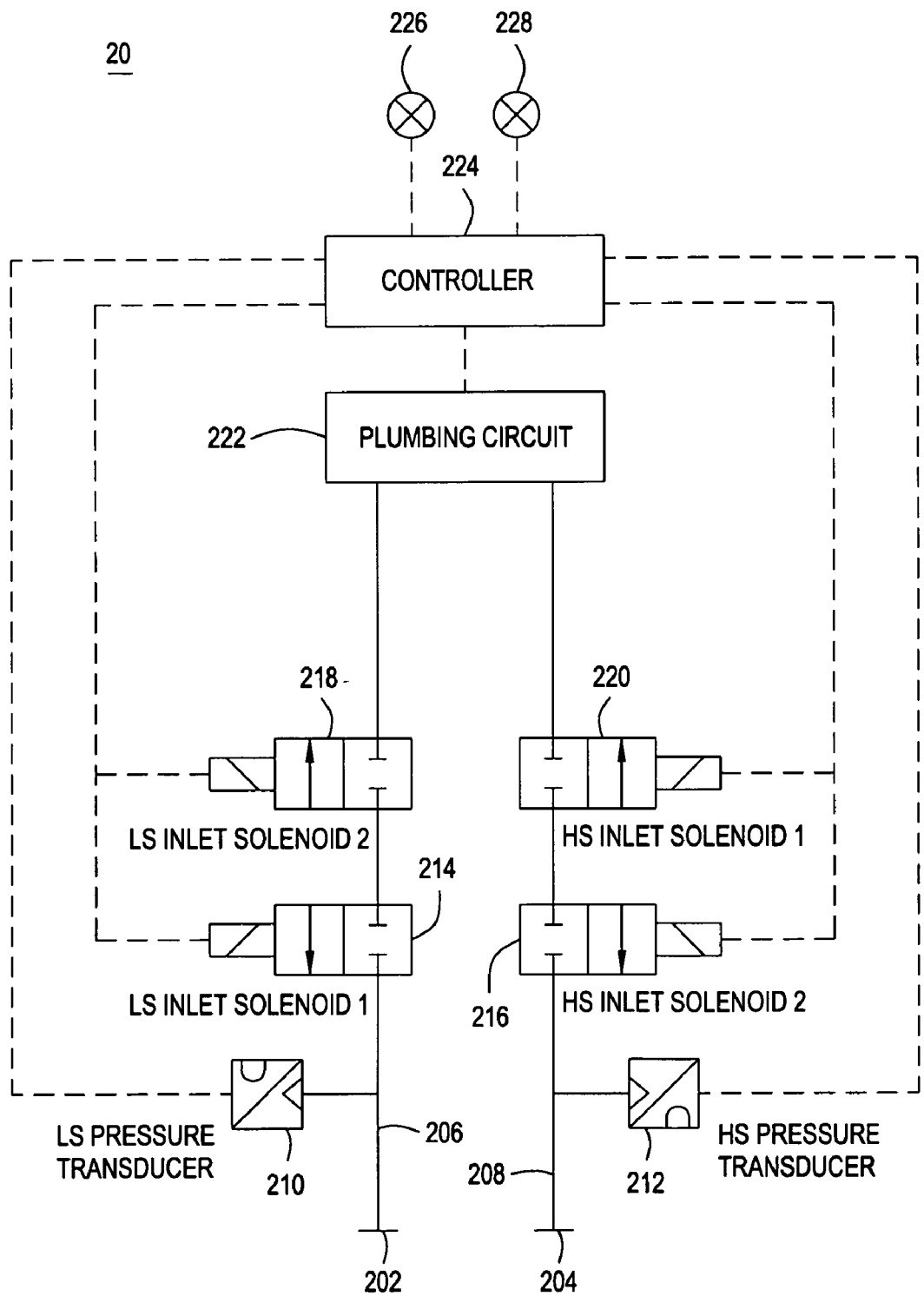
FIG. 2 is another view illustrating the electrically driven analog gauges incorporated in an air conditioning service station according to an embodiment of the invention.

FIG. 2 is another view illustrating the electrically driven analog gauges incorporated in the air conditioning service station 20 according to an embodiment of the invention. In this embodiment, the electrically driven analog pressure gauges 226, 228 are driven by a controller 224, which is electrically connected to the low side and high side pressure transducers 210, 212. The station 20 according to this embodiment having the controller 224 electrically connected to a plumbing circuit 222, two sets of inlet solenoids, low side inlet solenoids 214, 218, high side inlet solenoids 216, 220, and two electrically driven pressure gauges 226, 228. These pressure gauges 226, 228 having electrically driven needles (FIG. 3).

In addition, a low side refrigerant conduit 206 is connected to the low side pressure transducer 210 and the plumbing circuit 222 through the low side inlet solenoids 214, 218. The low side refrigerant conduit 206 is further coupled to a low side vehicle coupler 202. Similarly, a high side refrigerant conduit 208 is connected to high side pressure transducer 212 and the plumbing circuit 222 through the high side inlet solenoids 216, 220. The high side refrigerant conduit 208 is further coupled to a high side vehicle coupler 204.

In this embodiment, the pressure transducers 210, 212 communicate with the controller 224, which drives the gauges 226, 228 using electrical signals instead of refrigerant in the conduits as in the prior art. Therefore, upon measuring the pressure of the air conditioning system of a vehicle, the pressure transducers 210, 212 communicate electrically with the controller 224, and it converts the electrical signals to drive the needle 310 of the analog gauges 226, 228.

The plumbing circuit 222 transfers refrigerant between the air conditioning service station 20 and a vehicle. The solenoid valves 214, 216, 218, 220 are configured between the plumbing circuit 222 and the ends of the refrigerant conduits, such that the solenoid valves 214, 216, 218, 220 control the flow of the refrigerant. In addition, the controller 224 is electrically connected to the plumbing circuit 222 and the solenoid valves 214, 216, 218, 220, such that the controller controls the solenoid valves through electrical signals.

In another embodiment, the pressure transducers 210, 212 are electrically connected an electrical display (not shown). The electrical display can display pressure graphically, numerically, or a combination thereof. For example, this electrical display can display the pressure as an analog graphic with a dial and a needle.

FIG. 3 illustrates examples of gauges according to an embodiment of the invention. As illustrated, the station 10 can have analog display of gauges 320, digital display 330, graphic display 340, 350. The analog gauges 320 display the pressure with the electrically driven needles 310. With the digital display 330, the high side and low side pressure are shown in digital form. The graphic display can illustrate the change of pressure by changing the color of the display, or by showing increase or decrease of a bar display. These examples are illustrative and not limiting in nature.

The use of a plumping circuit is generally known in the art. In operation, during the diagnostic procedure, a technician can couple the refrigerant conduits from the air conditioning service system to a vehicle via the vehicle couplers. The technician can start the vehicle and the refrigerant pressure of the vehicle can be read on the high side and the low side gauges.

During the process, the technician can look at the rise and fall of the needles of the high side and low side gauges to determine whether the pressure in the system is changing. The analog movement, relative position, and interaction of the needles of the electrically driven pressures gauges aid the technician in diagnosing the performance of the air conditioning system. Alternatively, the display can also be a graphic display of analog gauges with pressure indicating needles. Furthermore, the display can also be a bar shaped indicator of pressures, or a combination of electrical or analog looking gauges.

In the recovery procedure, the technician can open the solenoids and start the compressor (not shown). When the compressor is turned on, it removes the refrigerant from the vehicle, the refrigerant travels pass the solenoid, passes the recovery check valve, passes the recovery solenoid, through the expansion valve, and past the system oil separator, where any oil in the refrigerant will be separated out in the separator. And then the refrigerant will pass through the filter/dryer, through the compressor, and into the compressor oil separator. The refrigerant continues past a discharge check valve, passes the coil and then into the internal storage vessel.

After the recovery, the technician can pull a vacuum on the air conditioning system by opening the inlet solenoids, the vacuum solenoid and turning the vacuum pump on. The technician can allow the vacuum to stay on for a desired period of time, or until the pressure gauges indicate a desired vacuum level has been reached. At this point, the vehicle is under a vacuum and there is a pressure differential between the automotive air conditioning system and the pressure of the refrigerant in the internal storage vessel.

Next, the technician can charge the vehicle with clean refrigerant. In this procedure, the high side and low side inlet solenoids along with the charge solenoid will be opened. Due to the pressure difference between the vehicle and the air conditioning system, when the solenoids are opened, refrigerant will flow from the internal storage vessel into the charge solenoid, pass the inlet solenoids and into the vehicle. And the vehicle will be charged with clean refrigerant until a predetermined amount of refrigerant has left the internal storage vessel, which is determined by weight. At this point, residual refrigerant remains in the hoses between the air conditioning system and the vehicle, and would need to be cleared to allow the technician to get an accurate reading on the charge. Therefore, the technician can use the high side and low side pressure gauges to tell if refrigerant is still in the hoses.

The present embodiment allows the technician to accurately charge the refrigerant in a vehicle with a certain level of accuracy. The solenoids are configured to be at the end of the hoses so they are closer to the vehicle. Therefore, there are less amount of refrigerant between the solenoids and the vehicle, thereby allowing a better charge accuracy.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic service equipment for a vehicle having a refrigerant system, comprising:
   (a) a plumbing circuit for transferring a refrigerant between the diagnostic service equipment and the refrigerant system of the vehicle;
   (b) a high side refrigerant conduit having a first connection, a second connection and a third connection, wherein the first connection is connected to the plumbing circuit and the second connection is connected to the refrigerant system;
   (c) a low side refrigerant conduit having a first connection, a second connection and a third connection, wherein the first connection is connected to the plumbing circuit and the second connection is connected to the refrigerant system; and
   (d) pressure transducers attached to each of the third connection of the high side refrigerant conduit and the low side refrigerant conduit, wherein the pressure transducers measure pressure of the high side and low side refrigerant conduits and convert the pressure into electrical signals to drive an analog-display pressure gauge.

2. The diagnostic equipment of claim 1, wherein the analog-display pressure gauge having an electrically driven needle.

3. The diagnostic equipment of claim 2, wherein the electrically driven needle is an indicator needle.

4. The diagnostic equipment of claim 1, wherein the pressure transducers transform the electrical signals into mechanical movement to drive an indicator needle, such that the movement of the indicator needle reflects the pressure of the refrigerant conduit measured by the pressure transducers.

5. The diagnostic equipment of claim 1, further comprising at least one inlet solenoid valve configured between the first connection of the refrigerant conduit and the plumbing circuit, such that the solenoid valve controls a flow of the refrigerant.

6. The diagnostic equipment of claim 5, further comprising a controller electrically connected to the plumbing circuit and the solenoid valve, wherein the controller controls the solenoid valves through an electrical signal.

7. A diagnostic service equipment for a vehicle having a refrigerant system, comprising:
   (a) a plumbing circuit for transferring a refrigerant between the diagnostic service equipment and the refrigerant system of the vehicle;
   (b) a high side refrigerant conduit having a first connection, a second connection and a third connection, wherein the first connection is connected to the plumbing circuit and the second connection is connected to the refrigerant system;
   (c) a low side refrigerant conduit having a first connection, a second connection and a third connection, wherein the first connection is connected to the plumbing circuit and the second connection is connected to the refrigerant system; and
   (d) pressure transducers attached to each of the third connection of the high side refrigerant conduit and the low side refrigerant conduit, wherein the pressure transducers measure pressure of the high side and low side refrigerant conduits and convert the pressure into electrical signals to display on an electrical display.

8. The diagnostic equipment of claim 7, wherein the electrical display can display the pressure graphically, numerically, or a combination thereof.

9. A diagnostic service equipment for a vehicle having a refrigerant system, comprising:
   (a) a plumbing circuit for circulating a refrigerant between the diagnostic equipment and the refrigerant system of the vehicle;
   (b) a high side refrigerant conduit having a first connection, a second connection and a third connection, wherein the first connection is connected to the plumbing circuit and the second connection is connected to the refrigerant system;
   (c) a low side refrigerant conduit having a first connection, a second connection and a third connection, wherein the first connection is connected to the plumbing circuit and the second connection is connected to the refrigerant system;
   (d) pressure transducers configured to attached to each of the third connection of the high side refrigerant conduit and the low side refrigerant conduit, wherein the pressure transducers measure pressure of the high side and low side refrigerant conduits and convert the pressure into electrical signals; and
   (e) electrical wires connecting the pressure transducers to a controller, wherein the controller is electrically connected to a display that is an electrical display or an electrically driven analog-display pressure gauge.

10. The diagnostic equipment of claim 9, wherein the pressure transducers transform the pressure into the electrical signal for the controller.

11. The diagnostic equipment of claim 9, wherein the analog-display pressure gauge having an electrically driven indicator needle and the indicator needle is electrically driven by the controller.

12. The diagnostic equipment of claim 11, wherein the electrical display is configured to display pressures digitally or graphically.

13. The diagnostic equipment of claim 9, the controller is further electrically connected to the plumbing circuit and at least one solenoid valve.

14. The diagnostic equipment of claim 13, the solenoid valve is configured between the first connection of the refrigerant conduit and the plumbing circuit, such that the solenoid valve controls a flow of the refrigerant.

15. The diagnostic equipment of claim 14, the controller electrically controls the solenoid valve through an electrical signal to control the flow of the refrigerant.

16. A diagnostic equipment for a vehicle, comprising:
   (a) means for circulating a refrigerant between the diagnostic equipment and the vehicle;
   (b) a high side passage means having a first connection, a second connection and a third connection, wherein the first connection is connected to the circulating means and the second connection is connected to the vehicle;

(c) a low side passage means having a first connection, a second connection and a third connection, wherein the first connection is connected to the circulating means and the second connection is connected to the vehicle;

(d) a pressure sensing means configured to attach to each of the third connection of the high side passage means and the low side passage means, wherein the pressure sensing means measures pressure of the high side and low side passage means and converts the pressure into electrical signals; and (e) a signaling means connecting the pressure sensing means to at least one display means.

17. The diagnostic equipment of claim 16, wherein the display means is an analog-display pressure gauge, an electrical display, a graphical display, or a combination thereof.

18. The diagnostic equipment of claim 17, wherein the analog-display pressure gauge having an electrically driven needle.

19. The diagnostic equipment of claim 18, wherein the pressure sensing means transforms the electrical signals into mechanical movements to drive the needle, such that the movements of the needle reflects the pressure of the passage means measured by the pressure sensing means.

20. A method for displaying pressure on analog-display pressure gauges of an air conditioning service station, comprising the steps of:

(a) connecting vehicle couplers of a high side and a low side refrigerant conduits to a vehicle;

(b) circulating refrigerant between the air conditioning service station and the vehicle;

(c) measuring a pressure of the refrigerant conduits as electrical signals;

(d) transforming the electrical signals to the analog-display pressure gauges; and (e) electrically driving needles of the analog-display pressure gauges to display the pressure.

21. The method of claim 20, further comprising the steps of:

providing at least one solenoid valve, wherein the solenoid valve is configured between a connection of a refrigerant conduit and a plumbing circuit; and controlling a flow of the refrigerant with the solenoid valve.

22. The method of claim 21, further comprising the steps of:

providing a controller electrically connected to the plumbing circuit and the solenoid valve, wherein the controller controls the solenoid valve through an electrical signal.

* * * * *